(12) United States Patent
Morikawa et al.

(10) Patent No.: US 7,976,911 B2
(45) Date of Patent: Jul. 12, 2011

(54) LIQUID CRYSTAL LAYER AND DISPLAY MEDIUM

(75) Inventors: Takashi Morikawa, Ebina (JP); Haruo Harada, Ebina (JP); Hiroshi Arisawa, Ebina (JP); Yasunori Okano, Tokyo (JP); Chisato Urano, Ebina (JP); Atsushi Hirano, Ebina (JP); Taijyu Gan, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 61 days.

(21) Appl. No.: 12/508,941

(22) Filed: Jul. 24, 2009

(65) Prior Publication Data

US 2010/0209629 A1   Aug. 19, 2010

(30) Foreign Application Priority Data

Feb. 16, 2009   (JP) .................. 2009-033111

(51) Int. Cl.
*C09K 19/54* (2006.01)
*C09K 19/36* (2006.01)
*G02F 1/13* (2006.01)

(52) U.S. Cl. .................. 428/1.1; 252/299.5; 252/299.7
(58) Field of Classification Search .................. 428/1.1; 252/299.7, 299.5
See application file for complete search history.

(56) References Cited

FOREIGN PATENT DOCUMENTS

| | | |
|---|---|---|
| JP | A-10-177191 | 6/1998 |
| JP | A-2000-111942 | 4/2000 |
| JP | A-2007-298818 | 11/2007 |

OTHER PUBLICATIONS

Glushchenko et al.; "23.3: Cholesteric Colloid of Ferroelectric Nanoparticles;" *SID 07 Digest*; 2007; pp. 1086-1089.

*Primary Examiner* — Shean C Wu
(74) *Attorney, Agent, or Firm* — Oliff & Berridge, PLC

(57) ABSTRACT

The invention provides a liquid crystal layer in which an additive containing an aliphatic organic compound including at least one carbon-carbon double bond is added to a cholesteric liquid crystal in an amount of approximately 3 wt % or more and approximately 10 wt % or less.

6 Claims, 5 Drawing Sheets

LIQUID CRYSTAL LAYER AND DISPLAY MEDIUM

CROSS-REFERENCE TO RELATED APPLICATIONS

This application is based on and claims priority under 35 USC 119 from Japanese Patent Application No. 2009-033111 filed Feb. 16, 2009.

BACKGROUND

1. Technical Field

The present invention relates to a liquid crystal layer and a display medium.

2. Related Art

As a display medium such as electronic paper, for example, there is an optical recording display medium that records an image corresponding to irradiated recording light and displays the recorded image. As an example of a method for controlling such a display medium, there is a threshold shift method in which a laminated light modulation element is used. With such a threshold shift method, a display layer formed of two layers or more can be controlled independently with a single driving signal.

SUMMARY

A liquid crystal layer according to an aspect of the present invention is a liquid crystal layer in which an additive containing an aliphatic organic compound including at least one carbon-carbon double bond is added to a cholesteric liquid crystal in an amount of approximately 3 wt % or more and approximately 10 wt % or less.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described.

A. Configuration

A-1. Overall Configuration

Figure 1:
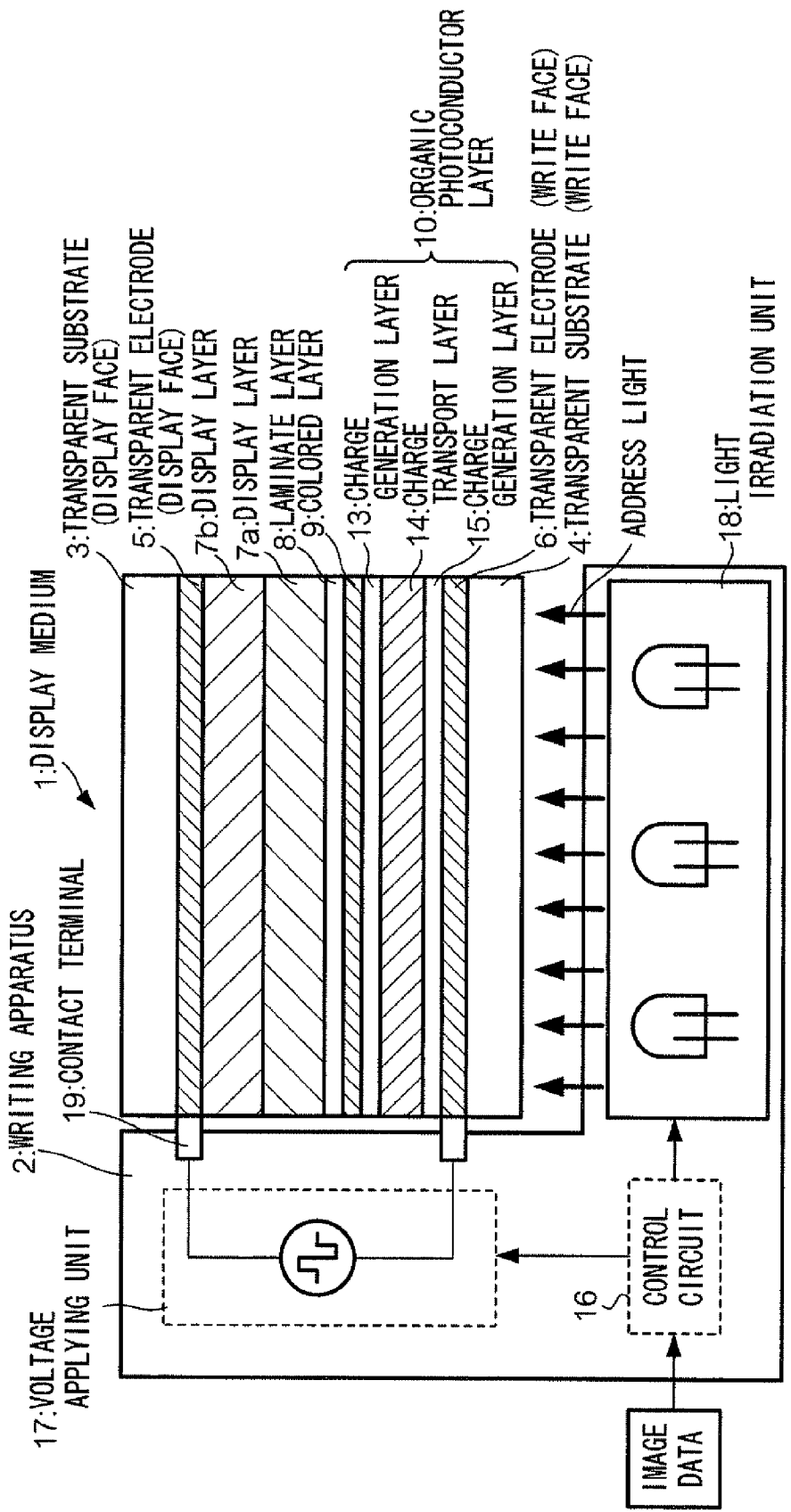
FIG. 1 is a diagram used to illustrate a system of an exemplary embodiment of the present invention.

FIG. 1 is a diagram used to illustrate a system according to the present exemplary embodiment. The system includes a display medium (reflective liquid crystal display element) 1 and a writing apparatus (driving apparatus of the reflective liquid crystal display element) 2.

A-2. Configuration of Display Medium

The display medium 1 is a member capable of selectively operating multiple liquid crystal layers by the irradiation of address light and the application of a bias signal, and a specific example thereof is a reflective liquid crystal display element.

As shown in FIG. 1, the display medium 1 includes a transparent substrate 3, a transparent electrode 5, a display layer 7b, a display layer 7a, a laminate layer 8, a colored layer (light shielding layer) 9, an organic photoconductor (OPC) layer 10, a transparent electrode 6 and a transparent substrate 4 that are laminated in this order from the display face side.

A-2-1. Configuration of Transparent Substrate

The transparent substrates 3 and 4 are members that are provided for the purpose of maintaining the structure of the display medium and include various function layers therebetween. It is preferable that the transparent substrates 3 and 4 are sheet-like objects having enough strength to withstand an external force, have a function of transmitting at least incident light, and are flexible. Specific materials include inorganic sheets (e.g., glass/silicon), polymer films (e.g., polyethylene terephthalate, polysulfone, polyether sulfone, polycarbonate, polyethylene naphthalate), and the like. Known functional films may be formed on the outer surface, such as an anti-fouling film, a wear resistant film, an anti-reflective film, a gas barrier film, etc.

A-2-2. Configuration of Transparent Electrode

The transparent electrodes 5 and 6 are members that apply a bias voltage applied by the writing apparatus 2 uniformly to the surface of respective function layers of the display medium 1. The transparent electrodes 5 and 6 have a surface-uniform conductivity, and transmit at least incident light and address light. Specific examples include thin conductive films made of a metal (e.g., gold, aluminum), a metal oxide (e.g., indium oxide, tin oxide, indium tin oxide (ITO)), a conductive organic polymer (e.g., polythiophene-based polymer, polyaniline-based polymer) or the like. Functional films, such as an adhesion-improving film, an anti-reflective film, a gas barrier film, etc., may be formed on the surface. In the present invention, the electrode that is not on the display face side (the transparent electrode 6 in the case of the present exemplary embodiment) may not be transparent outside the wavelengths of writing light.

A-2-3. Configuration of Display Layer

The display layers 7a and 7b (hereinafter, collectively referred to as a "display layer 7" when it is unnecessary to distinguish them) have a function of modulating the reflection and transmission state regarding specific colored light of the incident light depending on the electric field, and is capable of maintaining a selected state in the absence of an electric field. It is preferable that the display layer 7 has a structure that does not deform under an external force such as bending and pressure. Specifically, the display layer 7 is formed of a liquid crystal layer made of a self-supporting liquid crystal composite that includes a cholesteric liquid crystal and a transparent resin. In other words, the display layer 7 is a liquid crystal layer that does not require a spacer or the like due to its self-supporting property as a composite. In the present exemplary embodiment, in the display layer 7, the cholesteric liquid crystal is dispersed within the polymer matrix (transparent resin).

However, in the present exemplary embodiment, the display layer 7 is not necessarily a liquid crystal layer of a self-supporting liquid crystal composite, and the display layer 7 may be configured only of a liquid crystal. In this case, in order to achieve a structure that does not deform under an external force such as bending and pressure, the display layer 7 is preferably divided by ribs of a honeycomb or grid shape. When the display layer 7 is made of a self-supporting liquid crystal composite, it is preferable that the droplets are uniform in size, and are densely disposed in a single layer.

Figure 2:
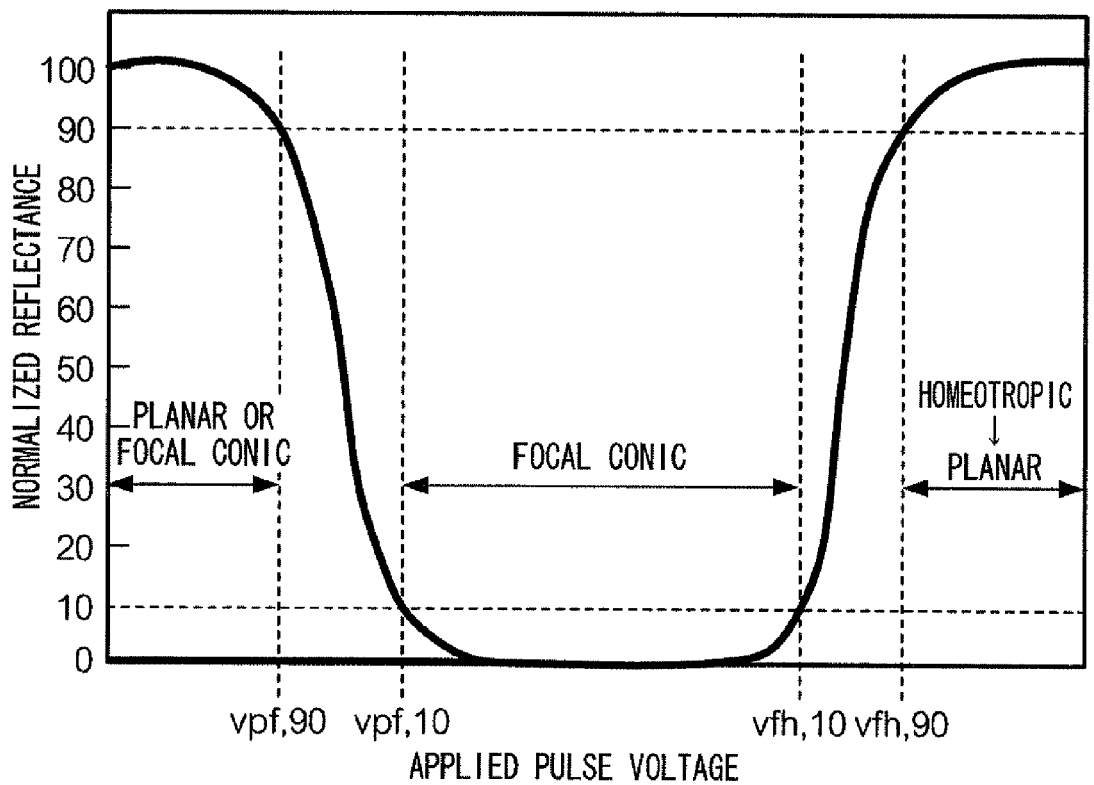
FIG. 2 is a graph showing the relationship between applied pulse voltage and normalized reflectance.

FIG. 2 is a graph showing the relationship between the voltage applied between the transparent electrodes 5 and 6 and the reflectance of incident light in an electric field direction of the cholesteric liquid crystal included in the display layer 7. The cholesteric liquid crystal takes three alignment states according to the applied voltage, including planar alignment (hereinafter referred to as the "P alignment") that is an alignment state in which the spiral axis of the liquid crystal director is approximately parallel to the electric field direction and the reflectance of incident light is high, focal conic alignment (hereinafter referred to as the "F alignment") that is an alignment state in which the spiral axis is approximately perpendicular to the electric field direction and the reflectance of incident light is low, and homeotropic alignment (hereinafter referred to as the "H alignment") that is an alignment state in which the spiral structure is unwound and the liquid crystal director is aligned in the electric field. Among these alignment states, the P alignment and the F alignment can exist bistably in the absence of an electric field, so the cholesteric liquid crystal in the P alignment or the F alignment has a memory property. In other words, the cholesteric liquid crystal in such an alignment state continuously maintains its alignment state even without a voltage being maintained. On the other hand, the H alignment is unstable and, when the voltage drops sharply, it switches to the P alignment and becomes stable. When the cholesteric liquid crystal is in the P alignment state, it reflects specific spiral-pitch-dependent light of the incident light (this is called "selective reflection").

Accordingly, when a pulse voltage is applied between the transparent electrodes 5 and 6, the cholesteric liquid crystal included in the display layer 7 exhibits a switching behavior as shown in FIG. 2. In other words, when the applied pulse voltage is Vfh,90 or more, the cholesteric liquid crystal switches from the H alignment to the P alignment, and thereby enters a selective reflection state. When the applied pulse voltage is between Vpf,10 and Vfh,10, the cholesteric liquid crystal enters a transmission state under the F alignment. When the applied pulse voltage is Vpf,90 or less, the cholesteric liquid crystal remains in the state before the pulse voltage is applied, or in other words, stays in a selective reflection state under the P alignment or a transmission state under the F alignment.

In FIG. 2, the vertical axis indicates normalized reflectance in which the reflectance is normalized with the maximum reflectance set to 100% and the minimum reflectance set to 0%. Because transition regions exist between the P alignment and the F alignment and between the F alignment and the H alignment, when the normalized reflectance is 90% or more, it is defined as a selective reflection state, and when the normalized reflectance is 10% or less, it is defined as a transmission state. Also, the threshold voltages for a phase change from the P alignment to the F alignment are set to Vpf,90 and Vpf,10 for the start and end of the transition region, respectively, and the threshold voltages for a phase change from the F alignment to the H alignment are set to Vfh,10 and Vfh,90 for the start and end of the transition region, respectively.

As described above, the cholesteric liquid crystal can change the reflection and transmission state regarding specific colored light of the incident light according to the applied voltage. In other words, the cholesteric liquid crystal has a function of modulating the reflection and transmission state regarding specific colored light of the incident light depending on the electric field.

Specific examples of liquid crystals that can be used as the cholesteric liquid crystal include nematic liquid crystals and smectic liquid crystals (e.g., Schiff base-based crystals, azo-based crystals, azoxy-based crystals, benzoic acid ester-based crystals, biphenyl-based crystals, terphenyl-based crystals, cyclohexyl carboxylic acid ester-based crystals, phenylcyclohexane-based crystals, biphenylcyclohexane-based crystals, pyrimidine-based crystals, dioxane-based crystals, cyclohexylcyclohexane ester-based crystals, cyclohexyl ethane-based crystals, cyclohexane-based crystals, tolan-based crystals, alkenyl-based crystals, stilbene-based crystals, condensed polycyclic-based crystals).

It should be noted that an additive containing an organic compound having at least one carbon-carbon double bond is added to such a cholesteric liquid crystal in an amount of approximately 3 wt % or more and approximately 10 wt % or less relative to the cholesteric liquid crystal.

It is desirable that the organic compound contained in the additive is a compound other than polymers such as polymerized compounds. It is more desirable that the organic compound contained in the additive satisfies at least any one of the following Conditions 1 to 5.

Condition 1: the organic compound is aliphatic.

Condition 2: the organic compound is an alcohol, a fatty acid or an ester.

Condition 3: carbon atoms belonging to a main chain bonded to carbon atoms forming a double bond are in a cis-type configuration.

Condition 4: the organic compound has one double bond.

Condition 5: the organic compound is oleyl alcohol, oleic acid or ethyl oleate.

Figure 3:
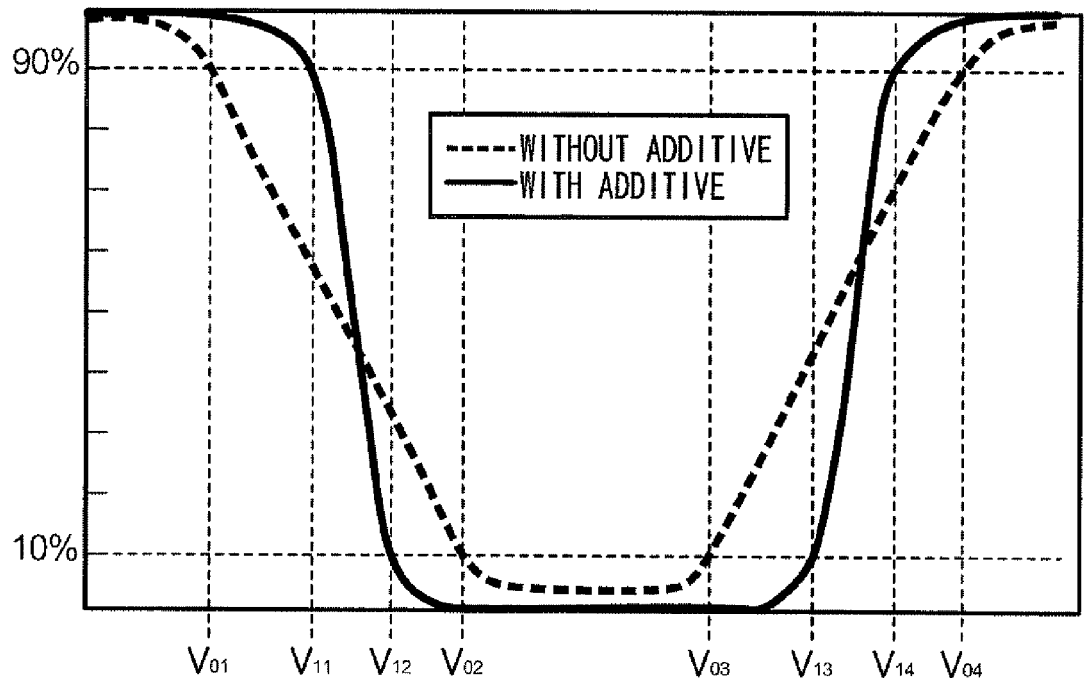
FIG. 3 is a diagram used to illustrate the effect obtained as a result of adding an additive to a cholesteric liquid crystal.

FIG. 3 is a diagram used to illustrate the effect obtained as a result of adding such an additive to a cholesteric liquid crystal.

When the above additive is not added to a cholesteric liquid crystal, the display medium 1 exhibits a characteristic curve indicated by the dotted line in FIG. 3. In other words, in the cholesteric liquid crystal to which no additive is added, a phase change from the P alignment to the F alignment occurs with a transition state ranging from $V_{01}$ to $V_{02}$ of the applied voltage therebetween, and a phase change from the F alignment to the H alignment occurs with a transition state ranging from $V_{03}$ to $V_{04}$ of the applied voltage therebetween.

On the other hand, when the above additive is added to the cholesteric liquid crystal, the display medium 1 exhibits a characteristic curve indicated by the solid line in FIG. 3. In other words, in the cholesteric liquid crystal to which the additive has been added, a phase change from the P alignment to the F alignment occurs with a transition state ranging from $V_{11}$ to $V_{12}$ of the applied voltage therebetween, and a phase change from the F alignment to the H alignment occurs with a transition state ranging from $V_{13}$ to $V_{14}$ of the applied voltage therebetween. The distance between $V_{11}$ and $V_{12}$ is shorter than that between $V_{01}$ and $V_{02}$, and the distance between $V_{13}$ and $V_{14}$ is shorter than that between $V_{03}$ and $V_{04}$. In other words, by adding the additive, the width of the transition state in the applied voltage is shortened, indicating the effect of achieving a steep phase change.

As the cholesteric liquid crystal, an optically active material (e g., steroid-based cholesterol derivative, Schiff base-based material, azo-based material, ester-based material, biphenyl-based material) may be added to these mixtures.

The helical pitch of the cholesteric liquid crystal is adjusted with an amount of a chiral agent added to a nematic liquid crystal or the like. For example, when producing blue, green and red display colors, adjustment is made such that the center wavelengths of selective reflections fall within a range of 400 nm to 500 nm, 500 nm to 600 nm, and 600 nm to 700 nm, respectively. In order to compensate for the temperature dependence of the helical pitch of the cholesteric liquid crystal, it is also possible to use a known method in which multiple chiral agents having different twist directions or inverse temperature dependence are added.

As a configuration in which the display layer 7 forms a self-supporting liquid crystal composite having a cholesteric liquid crystal and a polymer matrix (transparent resin), a PNLC (polymer network liquid crystal) structure in which a mesh resin is contained in a continuous phase of a cholesteric liquid crystal, or a PDLC (polymer dispersed liquid crystal) structure in which a cholesteric liquid crystal is dispersed in the form of droplets in a polymer skeleton can be used. By forming the display layer 7 so as to have the PNLC structure or the PDLC structure, an anchoring effect is produced at the interface between the cholesteric liquid crystal and the polymer, and a state in which the P alignment or the F alignment is maintained in the absence of an electric field can be further stabilized.

The PNLC structure or the PDLC structure can be formed by, for example, but is not limited to, known methods of inducing phase separation in polymers and liquid crystals, such as the PIPS (polymerization induced phase separation) method in which a polymer precursor that is polymerized by heat, light, or an electron beam or the like, such as an acrylic, thiol or epoxy polymer precursor, is mixed with a liquid crystal, and the mixture is polymerized with a uniform phase to induce phase separation, the emulsion method in which a polymer having a low solubility with liquid crystals, such as polyvinyl alcohol, is mixed with a liquid crystal and agitated/suspended to disperse droplets of the liquid crystal in the polymer, the TIPS (thermally induced phase separation) method in which a thermoplastic polymer and a liquid crystal are mixed and heated to form a uniform phase, which is then cooled to induce phase separation, and the SIPS (solvent induced phase separation) method in which a polymer and a liquid crystal are dissolved in a solvent, such as chloroform, and the solvent is evaporated to induce phase separation of the polymer and the liquid crystal.

The polymer matrix has a function of supporting the cholesteric liquid crystal and suppressing the flow of liquid crystal (change in image) due to the deformation of the display medium, and a polymer material that does not dissolve in the liquid crystal material and includes a liquid that is not compatible with the liquid crystal as a solvent is preferably used. Also, it is desirable that the polymer matrix is a material that has enough strength to withstand an external force, and high transmittance for at least reflected light and address light.

Examples of materials that can be used as the polymer matrix include: water soluble polymer materials (e.g., gelatin, polyvinyl alcohol, cellulose derivatives, polyacrylic acid-based polymers, ethyleneimine, polyethylene oxide, polyacrylamide, polystyrene sulfonic acid salts, polyamidine, isoprene-based sulfonic acid polymers); materials that can be formed into an aqueous emulsion (e.g., fluorocarbon resin, silicone resin, acrylic resin, urethane resin, epoxy resin); etc.

In the display medium 1, it is desirable that the threshold voltages of the display layers 7a and 7b are reasonably different from each other, and an operation margin (a difference between threshold voltages) for a threshold shift method is secured.

Figure 4:
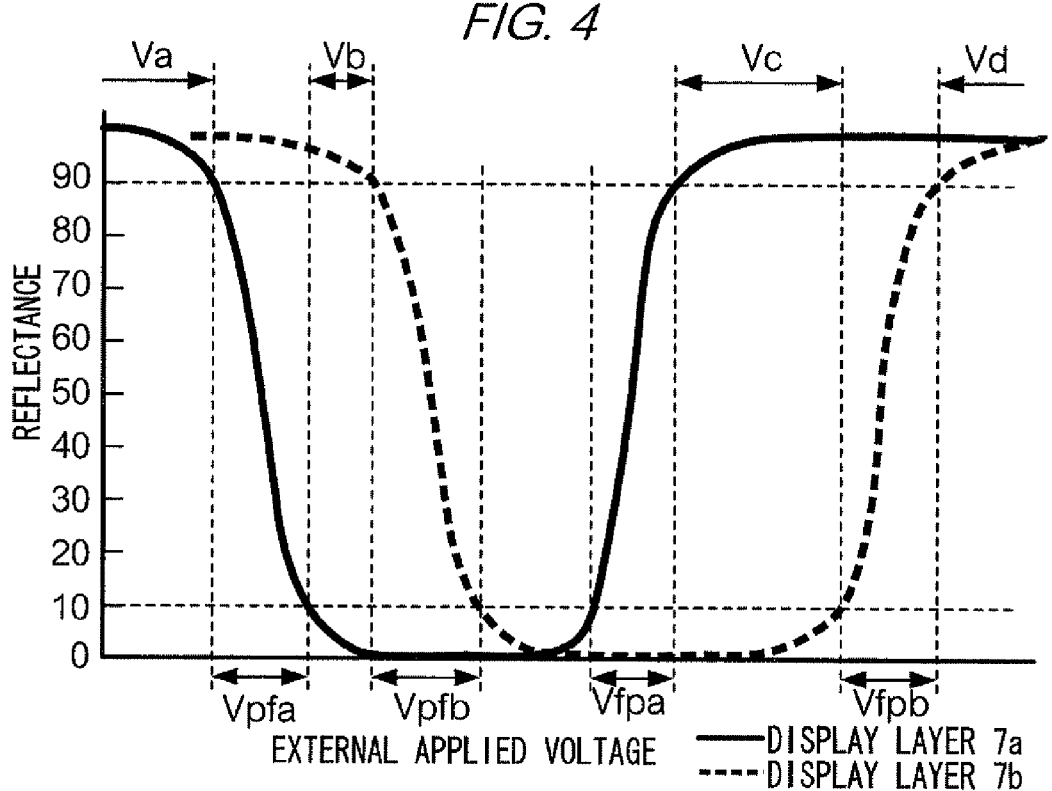
FIG. 4 is a graph showing the switching behaviors of two display layers.

FIG. 4 is a graph showing the switching behaviors of the cholesteric liquid crystals of the display layers 7a and 7b. As shown in FIG. 4, the cholesteric liquid crystals of the display layers 7a and 7b both undergo a phase change from a state before the application of a pulse voltage (e.g., a selective reflection state under the P alignment) to a transmission state under the F alignment as the externally applied voltage applied by a voltage applying unit 17, which will be described later, increases. When the externally applied voltage increases further, the cholesteric liquid crystals of the display layers 7a and 7b undergo a phase change from the F alignment to the H alignment. When the application of voltage is stopped, the cholesteric liquid crystals of the display layers 7a and 7b undergo a phase change from the H alignment to the P alignment, entering a selective reflection state.

However, as can be seen from the graph shown in FIG. 4, the threshold voltages at which such phase changes occur are adjusted so as to be different in the display layers 7a and 7b. Specifically, regarding the threshold voltage at which a phase change from the P alignment to the F alignment occurs (this is referred to as the "lower threshold" in the present exemplary embodiment), the display layer 7a has a transition region Vpfa, whereas the display layer 7b has a transition region Vpfb. In other words, regarding the lower threshold transition region, the cholesteric liquid crystal of the display layer 7b has higher values. Meanwhile, regarding the threshold voltage at which a phase change from the F alignment to the H alignment occurs (this is referred to as the "upper threshold" in the present exemplary embodiment), the display layer 7a has a transition region Vfpa, whereas the display layer 7b has a transition region Vfpb. In other words, regarding the upper threshold transition region, the cholesteric liquid crystal of the display layer 7b has higher values.

By configuring the display layer 7 so as to have two layers and setting different wavelengths of colored lights selectively reflected by the layers as described above, the display layer 7 can display an image by the additive mixing of two colors, or in other words, an image having two colors or more.

In the present exemplary embodiment, the capacity ratio and the resistance ratio are adjusted by adjusting the liquid crystal materials or the thickness of each layer, so that the layers have different threshold values.

The resistance ratio of a liquid crystal material can be controlled by, for example, mixing a fluorine-based material having a high resistance and a cyano-based material having a low resistance, or by adding an ionic impurity to the liquid crystal material. At this time, it is also necessary to provide a slight capacity difference between multiple display layers. Such a slight capacity difference between the display layers can be controlled by varying the dielectric constant of the liquid crystal materials relative to one another, or varying the thicknesses of the display layers relative to one another.

Other than the above, the switching behavior of the display layer 7 can also be controlled by the dielectric anisotropy, elastic modulus and helical pitch of the cholesteric liquid crystal constituting the display layer 7, the skeleton structure and side chain of the polymer, the phase separation process, the morphology of the interface between the polymer matrix and the display layer 7, the degree of anchoring effect at the interface between the polymer matrix and the display layer 7 that is determined by the total of these, etc.

More specific examples include, but are not limited to, the type or composition ratio of nematic liquid crystal, the type of additive, the type of chiral agent, the type of resin, the type or composition ratio of a starting material for a polymer resin such as a monomer, an oligomer, a starting agent, a cross-linking agent, the polymerization temperature, the exposure light source, exposure intensity, exposure time, and ambient temperature for photopolymerization, the electron intensity, exposure time, ambient temperature for electron beam polymerization, the type or composition ratio of a solvent when applying it, the solution concentration, the wet film thickness, the drying temperature, the starting temperature, temperature reduction speed or the like when reducing the temperature, etc.

In order to control the influence on the operation of applying an adjusted voltage that is unique to the present invention, the liquid crystal composition is preferably adjusted as described above. However, the behavior in response to the operation of applying an adjusted voltage varies depending on the liquid crystal material and, thus, it is necessary to achieve a configuration such that a desired action appears when an adjusted voltage is applied by adjusting the liquid crystal composition. Specific examples of such an adjustment include selecting liquid crystals, adjusting the composition of the liquid crystal, the viscosity of the liquid crystal material and the impedance, etc.

A-2-4. Configuration of Organic Photoconductor Layer

The organic photoconductor layer 10 is a layer that has an internal photoelectric effect and whose impedance characteristics change according to the irradiation intensity of the address light. The organic photoconductor layer 10 is capable of alternating current (AC: alternating current) operation, and is driven symmetrically with respect to the address light. Also, the organic photoconductor layer 10 is formed as a three layer structure in which charge generation layers (CGLs) are laminated on and under a charge transport layer (CTL). The organic photoconductor layer 10 shown in FIG. 1 is formed by laminating an upper charge generation layer 13, a charge transport layer 14 and a lower charge generation layer 15 in this order from the upper layer (the layer on the display face side).

The charge generation layers 13 and 15 are layers that have a function of absorbing address light and generating photo-carriers. Principally, the charge generation layer 13 determines the amount of photocarriers flowing in the direction from the transparent electrode 5 on the display face side toward the transparent electrode 6 on the write face side, and the charge generation layer 15 determines the amount of photocarriers flowing in the direction from the transparent electrode 6 on the write face side toward the transparent electrode 5 on the display face side. It is preferable that the charge generation layers 13 and 15 are capable of absorbing address light, generating exciters, and causing them to be efficiently separated to free carriers within the CGL or at the interface between the CGL and the CTL.

The charge generation layers 13 and 15 can be formed by a dry method in which a charge generation material (e.g., a metallic or non-metallic phthalocyanine, a squalirium compound, an azulenium compound, a perylene pigment, an indigo pigment, a bis- or tris-azo pigment, a quinacridone pigment, a pyrrolopyrrole colorant, a polycyclic quinone pigment, a condensed aromatic pigment such as dibromoan-thanthrone, a cyanine colorant, a xanthene pigment, a charge transfer complex such as polyvinylcarbazole or nitrofluorene, and an eutectic complex containing a pyrylium salt dye and a polycarbonate resin) is directly formed into a film, or by a wet coating method in which a charge generation material as listed above is dispersed or dissolved in an appropriate solvent together with a polymer binder (e.g., a polyvinyl butyral resin, a polyarylate resin, a polyester resin, a phenol resin, a vinylcarbazole resin, a vinyl formal resin, a partially modified vinylacetal resin, a carbonate resin, an acrylic resin, a vinyl chloride resin, a styrene resin, a vinyl acetate resin, a silicone resin, etc.) to prepare a coating solution, which is then applied and dried to form a film.

The charge transport layer 14 is a layer that has a function of allowing the photocarriers generated in the charge generation layers 13 and 15 to be injected and allowing the photo-carriers to drift in the direction of an electric field applied by the bias signal. Usually, the CTL has a thickness that is several tens of times the thickness of the CGL, so the contrast impedance of the whole organic photoconductor layer 10 is determined by the capacity of the charge transport layer 14, the dark current of the charge transport layer 14, and the photo-carrier current within the charge transport layer 14.

In the charge transport layer 14, it is preferable that the injection of free carriers from the charge generation layers 13 and 15 occurs efficiently (the charge transport layer 14 preferably has an ionization potential close to those of the charge generation layers 13 and 15), and the free carriers thus injected undergo hopping migration at a high speed. In order to increase the impedance in a dark state, it is preferable that the dark current resulting from thermal carriers is low.

The charge transport layer 14 may be formed by a method in which a low molecular weight hole transport material (e.g., a trinitrofluorene-based compound, a polyvinylcarbazole-based compound, an oxadiazole-based compound, a hydra-zone-based compound such as benzylamino hydrazone or quinoline hydrazone, a stilbene-based compound, a tripheny-lamine-based compound, a triphenylmethane-based compound, a benzidine-based compound) or a low molecular weight electron transport material (e.g., a quinone-based compound, a tetracyanoquinodimethane-based compound, a fluorenone-based compound, a xanthone-based compound, a benzophenone-based compound) is dispersed or dissolved in an appropriate solvent together with a polymer binder (e.g., a polycarbonate resin, a polyarylate resin, a polyester resin, a polyimide resin, a polyamide resin, a polystyrene resin, a silicon-containing crosslinked resin) to prepare a coating solution, which is then applied and dried.

A-2-5. Configuration of Colored layer

The colored layer 9 is a layer provided for the purpose of optically separating addressing light and incident light to prevent malfunction due to mutual interference. The colored layer 9 is not an essential constituent element in the present exemplary embodiment. However, it is desirable to include the colored layer 9 in order to improve the performance of the display medium 1. For this purpose, the colored layer 9 is required to have a function of absorbing at least light in the absorption wavelength region of the CGL.

Specifically, the colored layer 9 can be formed by a method in which an inorganic pigment (e.g., a cadmium-based pigment, a chromium-based pigment, a cobalt-based pigment, a manganese-based pigment, a carbon-based pigment) or an organic dye or an organic pigment (an azo-based dye or pigment, an anthraquinone-based dye or pigment, an indigo-based dye or pigment, a triphenylmethane-based dye or pigment, a nitro-based dye or pigment, a phthalocyanine-based dye or pigment, a perylene-based dye or pigment, a pyrrol-opyrrole-based dye or pigment, a quinacridone-based dye or pigment, a polycyclic quinone-based dye or pigment, a squa-lirium-based dye or pigment an azulenium-based dye or pigment, a cyanine-based dye or pigment, a pyrylium-based dye or pigment, an antlirone-based dye or pigment) is applied directly onto the charge generation layer 13 side face of the organic photoconductor layer 10, or a method in which the pigment or dye is dispersed or dissolved in an appropriate solvent together with a polymer binder (e.g., a polyvinyl alcohol resin, a polyacrylic resin) to prepare a coating solution, which is then applied and dried.

A-2-6. Configuration of Laminate Layer

For the laminate layer 8, a material that contains a polymer material having a low glass transition point and that is capable of firmly attaching or bonding the display layers 7a and 7b and the colored layer 9 by heat or pressure is selected. Furthermore, the material needs to be capable of transmitting at least incident light and address light.

Examples of materials suitable for the laminate layer 8 include adhesive polymer materials (e.g., a urethane resin, an epoxy resin, an acrylic resin, a silicone resin).

It should be noted, however, that the laminate layer 8 is not an essential constituent element in the present exemplary embodiment.

A-3. Configuration of Writing Apparatus

In the present exemplary embodiment, the writing apparatus 2 is an apparatus that writes images into the display medium 1, and includes a light irradiation unit (exposure apparatus) 18 that applies address light to the display medium 1 and a voltage applying unit (power source apparatus) 17 that applies a bias voltage to the display medium 1 as the primary constituent elements, and further includes a control circuit 16 that controls the operations of these units.

A-3-1. Configuration of Voltage Applying Unit

The voltage applying unit 17 can be any device as long as it has a function of applying a preset bias voltage to the display medium 1 and is capable of applying a desired voltage waveform to the display medium (between the electrodes) based on the input signal from the control circuit 16. The voltage applying unit 17 is, however, required to be capable of AC output and have a high slew rate. Also, the voltage applying unit 17 may be capable of changing the frequency of the voltage to be applied. As the voltage applying unit 17, for example, a bipolar high voltage amplifier or the like can be used.

The voltage applying unit 17 applies a voltage to the display medium 1 by applying it between the transparent electrodes 5 and 6 via a contact terminal 19.

The contact terminal 19 is a member that is in contact with the voltage applying unit 17 and the display medium 1 (transparent electrodes 5 and 6) and conducts electricity between the voltage applying unit 17 and the display medium 1, and a highly conductive material having a small contact resistance with the transparent electrodes 5 and 6 and the voltage applying unit 17 is selected. It is preferable that the contact terminal 19 has a structure in which it can be separated from either or both of the transparent electrodes 5, 6 and the voltage applying unit 17 so that the display medium 1 and the writing apparatus 2 can be separated.

As the contact terminal 19, a terminal that is made of a metal (e.g., gold, silver, copper, aluminum, iron), carbon, a composite in which such a metal or carbon is dispersed, a conductive polymer (e.g., polythiophene-based polymer, polyaniline-based polymer) or the like and that has a clip/connector shape capable of sandwiching the electrodes can be used.

A-3-2. Configuration of Light Irradiation Unit

There is no particular limitation on the light irradiation unit 18 as long as it has a function of applying address light to the display medium 1, and is capable of applying optical image patterns (spectrum, intensity, spatial frequency) onto the display medium 1 (more specifically, on the organic photoconductor layer 10) based on the output signal from the control circuit 16.

As the address light applied by the light irradiation unit 18, address light that satisfies the following conditions is preferably selected.

Spectrum: preferably, the amount of energy in the absorption wavelength range of the organic photoconductor layer 10 is large.

Irradiation intensity: such an intensity that the voltage applied to each display layer 7 becomes equal to or greater than the upper/lower threshold voltage due to the divided voltage with the organic photoconductor layer 10 in a bright state so that the liquid crystal contained in the display layer 7 undergoes a phase change, and becomes equal to or less than the upper/lower threshold voltage in a dark state.

It is desirable that the address light applied by the light irradiation unit 18 has a peak intensity within the absorption wavelength range of the organic photoconductor layer 10 and a narrow band width.

Specific examples of the light irradiation unit 18 are as follows.

(1-1) A uniform light source such as a light source in which light sources (e.g., a cold cathode tube, a xenon lamp, a halogen lamp, an LED (light emitting diode), an EL (electro luminescence), etc) are disposed in an array, a light source in which a light source and a light guide plate are combined, and so on.

(1-2) A combination of light modulation elements that create optical patterns (e.g., an LCD (liquid crystal display), a photomask, etc.).

(2) A surface light-emitting display (e.g., a CRT (cathode ray tube), a PDP (plasma display panel), an EL, an LED, a FED (field emission display), and an SED (surface-conduction electron-emitter display)).

(3) A combination of (1-1), (1-2) or (2) given above and an optical element (e.g., a microlens array, a selfoc lens array, a prism array, a viewing angle adjustment sheet).

A-3-3. Configuration of Control Circuit

The control circuit 16 is a member that has a function of controlling the operations of the voltage applying unit 17 and the light irradiation unit 18 according to image data from an external apparatus (an image capturing apparatus, an image receiving apparatus, an image processing apparatus, an image reproduction apparatus, an apparatus having such multiple functions, or the like). Specifically, the control circuit 16 controls the voltage applying unit 17 to apply a preset voltage to the display medium 1, and controls the light irradiation unit 18 to apply address light that constitutes an optical image pattern based on the obtained image data to the organic photoconductor layer 10 of the display medium 1.

B. Operation

Hereinafter, the operation of this system will be described with reference to FIG. 4 explained above.

The control circuit 16 controls the voltage applying unit 17 to apply a bias voltage such that a voltage within Vc (reset voltage) that is lower than the transition region Vfpb of the display layer 7b and is higher than the transition region Vfpa of the display layer 7a is applied to the whole display layer 7. At the same time, the control circuit 16 controls the light irradiation unit 18 so as to selectively expose the display medium 1 to light, changing (decreasing) the resistance value of the organic photoconductor layer 10 in an area that has been exposed to light (hereinafter referred to as the "exposed portion"), thereby increasing the divided voltage between the display layers 7a and 7b. By doing so, in the exposed portion, the voltage applied to the display layers 7a and 7b exceeds the transition region Vfpb. In other words, in the exposed portion, a voltage within Vd is applied and, needless to say, in the non-exposed portion, a voltage within Vc remains applied. Accordingly, in the exposed portion, both the display layers 7a and 7b switch to the P alignment via the H alignment, entering a selective reflection state, whereas in the non-exposed portion, the display layer 7a is in a selective reflection state and the display layer 7b is in a transmission state under the F alignment.

The principles of the above-described switching can also be applied to the lower threshold. In other words, control is performed such that a bias voltage within the Va that is lower than the transition region Vpfa of the display layer 7a is applied to the whole display layer by the voltage applying unit 17, the display medium 1 is selectively exposed to light by the light irradiation unit 18 and, by doing so, a phase change of the liquid crystal can be selected between a portion that exceeds the transition region Vpfa and a portion that does not exceed the transition region Vpfa.

In other words, when a laminated light modulation element including a photoconductive layer is driven by a threshold shift method, writing can be performed by applying preset upper and lower threshold voltages, and selectively applying light while applying the voltage.

As described above, by adding an additive containing an organic compound having at least one carbon-carbon double bond to a cholesteric liquid crystal, a steep phase change is obtained. In other words, the widths of the transition regions (Vpfa, Vpfb, Vfpa and Vfpb) shown in FIG. 4 are shortened and, as a result, the amount by which the threshold voltages of the displayer layers 7 are separated can be reduced so as to secure an operation margin in which control is possible. Accordingly, with the system of the present exemplary embodiment, it is possible to reduce the electricity necessary to perform control.

C. Variations

Up to here, an exemplary embodiment has been described, but the content of this exemplary embodiment may be modified as follows. It is also possible to combine the variations given below.

(1) In the above-described exemplary embodiment, a display layer 7 configured of two layers was given as a specific example, but the display layer 7 is not limited to such a two layer configuration, and can be configured of one layer or three or more layers. By adopting a three layer structure in which the layers produce blue, green and red, respectively, and performing additive mixing, it becomes possible to cause the display medium 1 to display a full color image. In this case, the reflective liquid crystal display element may be configured such that the upper and lower thresholds are adjusted so as to create differences in threshold voltage values among the three layers.

(2) In the above-described exemplary embodiment, a writing apparatus 2 including a light irradiation unit that applies address light was described, but it is also possible to use a writing apparatus that does not employ "optical writing" by the application of address light. In this case, the organic photoconductor layer 10 is not a requirement in the display medium. In short, it is sufficient that the writing apparatus 2 has a function of applying a preset bias voltage to the display medium 1 and is capable of applying a desired voltage waveform to the display medium (between the electrodes) based on the input signal from the control circuit 16.

(3) In the above-described exemplary embodiment, no reference was made to the ratio of the organic compound contained in the additive relative to the entirety of the additive, but the ratio is desirably 50% or more, and most desirably 99% or more.

Conditions 1 to 5 were described as the conditions that are to be satisfied by the organic compound contained in the additive, but the conditions are not limited thereto. The conditions can include, for example, "having a straight-chain unsaturated hydrocarbon group that has a cis structure" or "having an oleyl group".

EXAMPLES

D. Examples

Hereinafter, examples of the present invention will be described.

D-1. Experiment 1

In Experiment 1 given below, an evaluation was made of the effect of a steep change in the phase change phenomenon with respect to the amount of additive added, using oleic acid as the additive. Specifically, the applied voltage and the wavelength of incident light were changed, and the reflected light was measured.

Example 1

Oleic acid as an additive was added in an amount of 5 wt % to a cholesteric liquid crystal (Cholesteric Liquid Crystal 94615 available from DIC Corporation) and, then, the resultant was injected into a vertically aligned 5 μm glass cell (available from EHC Corporation) by capillary action. This glass cell was evaluated using an integrating sphere (available from Minolta Corporation).

Example 2

The same experiment as in Example 1 was performed, except that the amount of additive was changed to 10 wt %.

Comparative Example 1

The same experiment as in Example 1 was performed, except that the amount of additive was changed to 0 wt %.

Comparative Example 2

The same experiment as in Example 1 was performed, except that the amount of additive was changed to 15 wt %.

Figure 5:
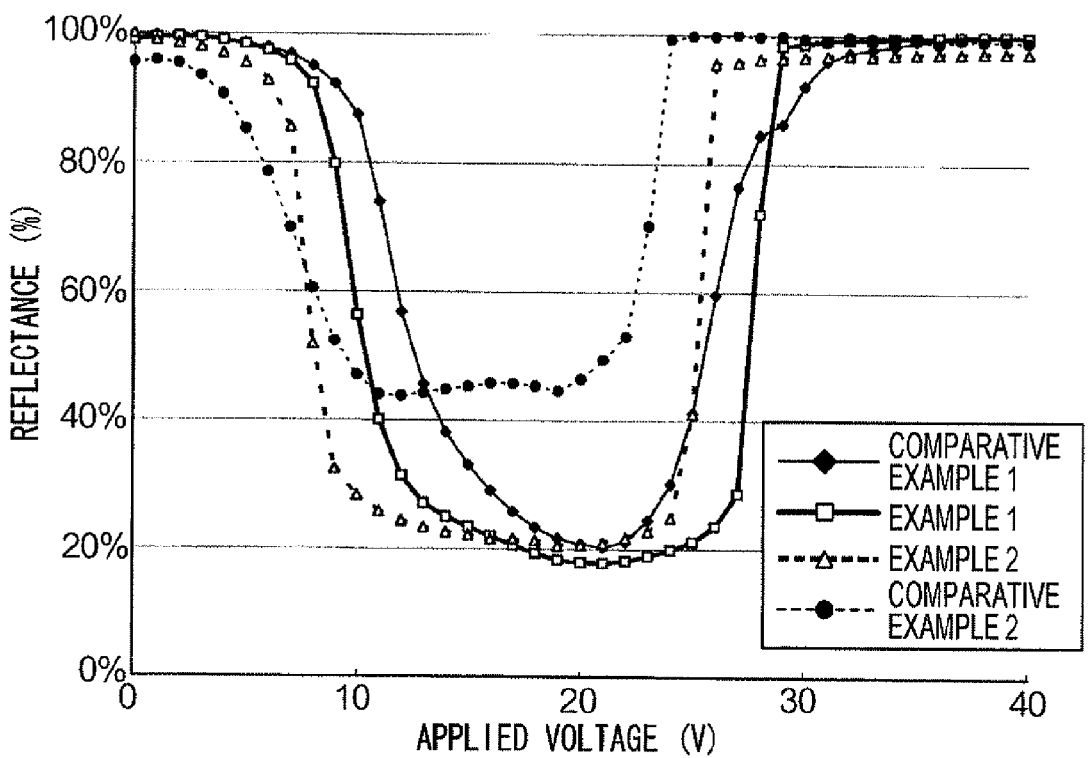
FIG. 5 is a graph showing the relationship between applied pulse voltage and reflectance when the amount of additive is changed.

FIG. 5 is a diagram showing the relationship between the applied voltage and reflectance (normalized reflectance) of Examples 1 and 2 and Comparative Examples 1 and 2. When no additive was added to the cholesteric liquid crystal, as can be seen from the result of Comparative Example 1, the voltage width of the transition state during phase change is broad, indicating that a slow phase change occurred. On the other hand, when the additive was added in an amount of 5 wt %, as can be seen from the result of Example 1, a steeper phase change than that of Comparative Example 1 occurred. Likewise, when the additive was added in an amount of 10 wt %, as can be seen from the result of Example 2, a steeper phase change than that of Comparative Example 1 occurred. When the additive was added in an amount of 15 wt %, as can be seen from the result of Comparative Example 2, a slow phase change occurred.

Figure 6:
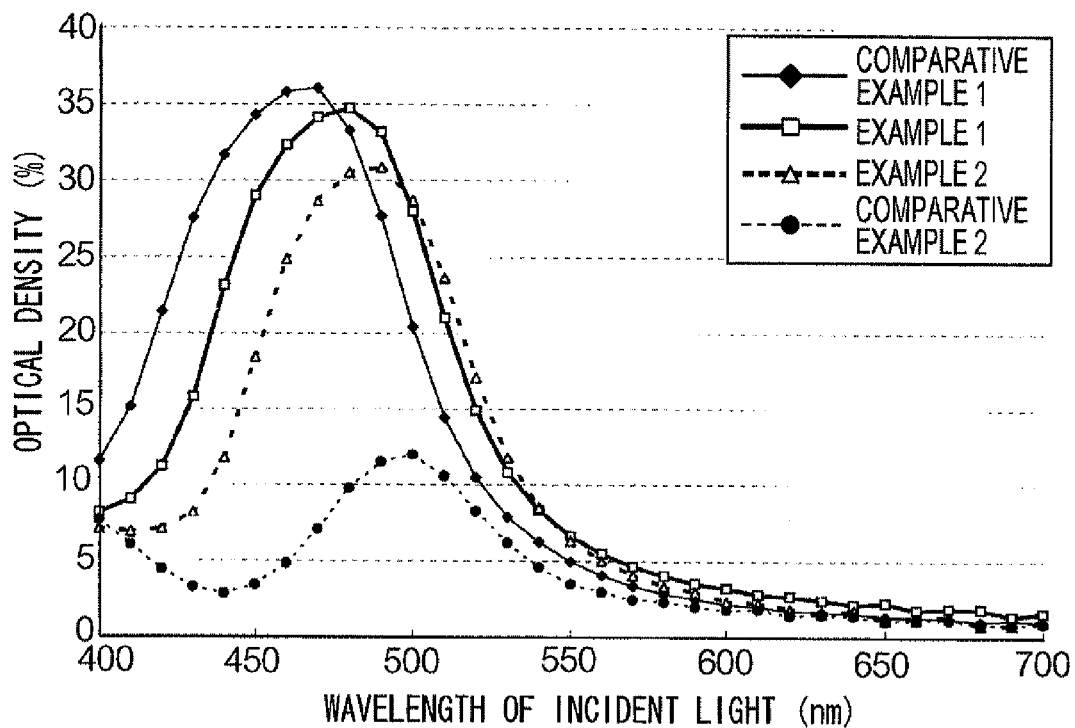
FIG. 6 is a graph showing the relationship between incident light wavelength and optical density when the amount of additive is changed.

FIG. 6 is a diagram showing the relationship between the incident light wavelength and optical density (the intensity of reflected light relative to incident light) of Examples 1 and 2 and Comparative Examples 1 and 2. In Examples 1 and 2 and Comparative Example 2 in which the additive was added, the wavelength representing an optical density peak has shifted toward the long wavelength side as compared to that of Comparative Example 1 in which no additive was added. In Comparative Example 2, the peak value of the optical density decreased significantly as compared to that of Comparative Example 1.

D-2. Experiment 2

In Experiment 2 given below, an evaluation was made of the effect of a steep change in the phase change phenomenon by setting the amount of additive to a constant value and selecting the additive from among various organic compounds. Specifically, the applied voltage and the incident light wavelength were changed, and the reflected light was measured. The additives were added at a temperature equal to or higher than the nematic phase-isotropic phase transition temperature Ti.

Example 3

Oleic acid as an additive was added in an amount of 5 wt % to a cholesteric liquid crystal (available from Merck Corporation), and the resultant was contained in a vertically aligned 10 μm glass cell (available from EHC Corporation) as in Experiment 1. This glass cell was evaluated using an integrating sphere (available from Minolta Corporation).

Example 4

The same experiment as in Example 3 was performed, except that ethyl oleate was used as an additive.

Example 5

The same experiment as in Example 3 was performed, except that oleyl alcohol was used as an additive.

Comparative Example 3

The same experiment as in Example 3 was performed, except that no additive was added.

Comparative Example 4

The same experiment as in Example 3 was performed, except that octadecane was used as an additive.

Comparative Example 5

The same experiment as in Example 3 was performed, except that octadecyl benzene was used as an additive.

Comparative Example 6

The same experiment as in Example 3 was performed, except that stearic acid was used as an additive.

Comparative Example 7

The same experiment as in Example 3 was performed, except that ethyl stearate was used as an additive.

Figure 7:
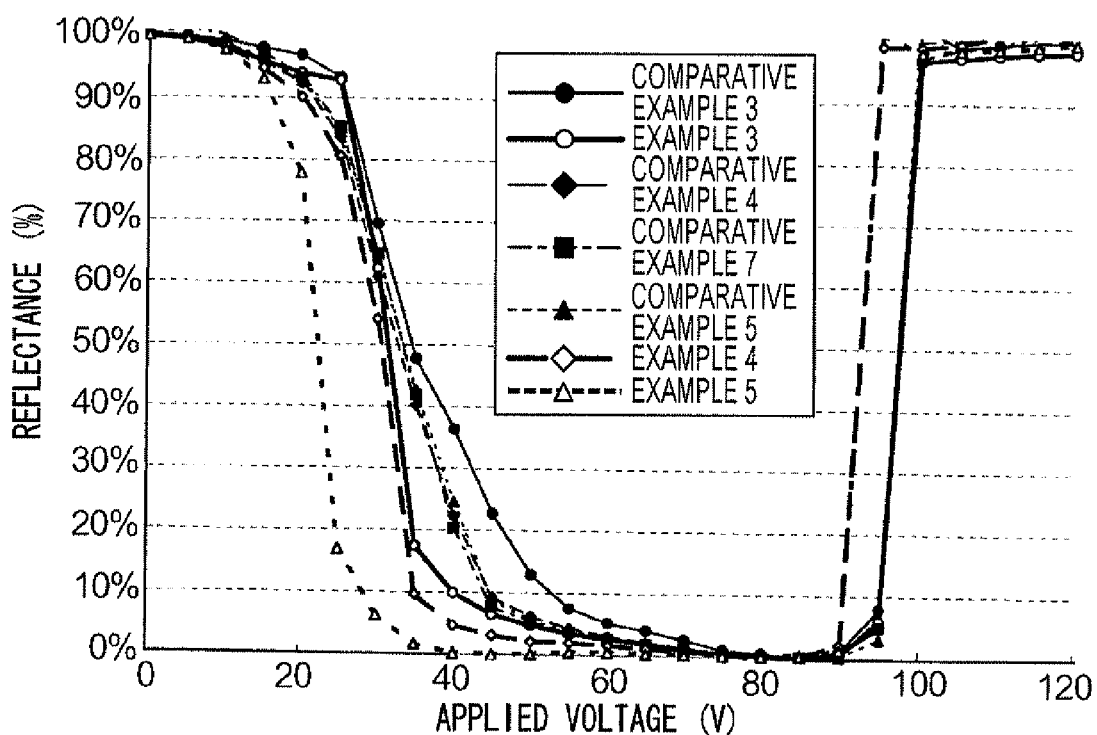
FIG. 7 is a graph showing the relationship between applied pulse voltage and reflectance when the additive is changed.

FIG. 7 is a diagram showing the relationship between the applied voltage and the reflectance (normalized reflectance) of Examples 3 to 5 and Comparative Examples 3 to 5 and 7. When no additive was added to the cholesteric liquid crystal, as can be seen from the result of Comparative Example 3, the voltage width of the transition state in a phase change is broad, indicating that a slow phase change occurred. On the other hand, when oleic acid, ethyl oleate or oleyl alcohol was added as an additive in an amount of 5 wt %, as can be seen from the results of Examples 3 to 5, a steeper phase change than that of Comparative Example 3 occurred. When octadecane, octadecyl benzene or ethyl stearate was added as an additive in an amount of 5 wt %, as can be seen from the results of Comparative Examples 4, 5 and 7, a phase change almost similar to that of Comparative Example 3 occurred. When stearic acid was added as an additive in an amount of 5 wt % (Comparative Example 6), it was not possible to take measurements due to deposition of the additive at room temperature.

Figure 8:
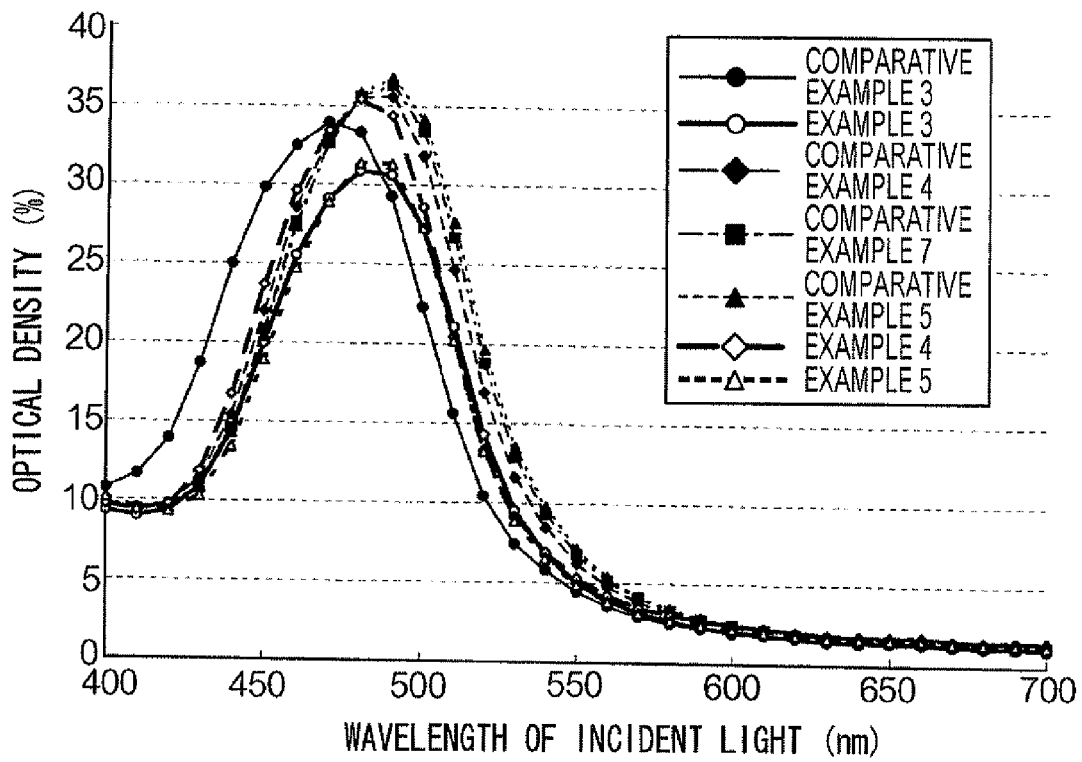
FIG. 8 is a graph showing the relationship between incident light wavelength and optical density when the additive is changed.

FIG. 8 is a diagram showing the relationship between the incident light wavelength and the optical density of Examples 3 to 5 and Comparative Examples 3 to 5 and 7. In Examples 3 to 5 and Comparative Examples 4, 5 and 7 in which additives were added, the wavelength representing an optical density peak has shifted toward the long wavelength side as compared to that of Comparative Example 3 in which no additive was added.

D-3. Experiment 3

In Experiment 3 given below, an evaluation was made of the effect of a steep change in the phase change phenomenon with respect to the amount of additive added by using oleic acid as the additive as in Experiment 1, and changing the amount of additive from 0 wt % (Comparative Example 1) to 5 wt % (Example 1) in increments of 1 wt %. Specifically, the applied voltage was changed, and reflected light was measured.

Herein, Vpf,10 refers to the threshold voltage at which a phase change from the P alignment and the F alignment occurs when the normalized reflectance is 10%. Vpf,50 refers to the threshold voltage at which a phase change from the P alignment and the F alignment occurs when the normalized reflectance is 50%. Vpf,90 refers to the threshold voltage at which a phase change from the P alignment and the F alignment occurs when the normalized reflectance is 90%.

y90,10 refers to the index that indicates the steepness of a phase change from the P alignment to the F alignment, and is defined by the following Equation (1).

Equation 1

$$y90,10=(Vpf,10-Vpf,90)/Vpf,50 \quad (1)$$

In other words, y90,10 is a value obtained by dividing a difference obtained by subtracting Vpf,90 from Vpf,10 (Vpf,10>Vpf,90, this difference is always positive) by Vpf,50 (positive value). As this value becomes smaller, it indicates that the transition region of the phase change from the P alignment to the F alignment is narrow, or in other words, the phase change from the P alignment to the F alignment is steep.

Figure 9:
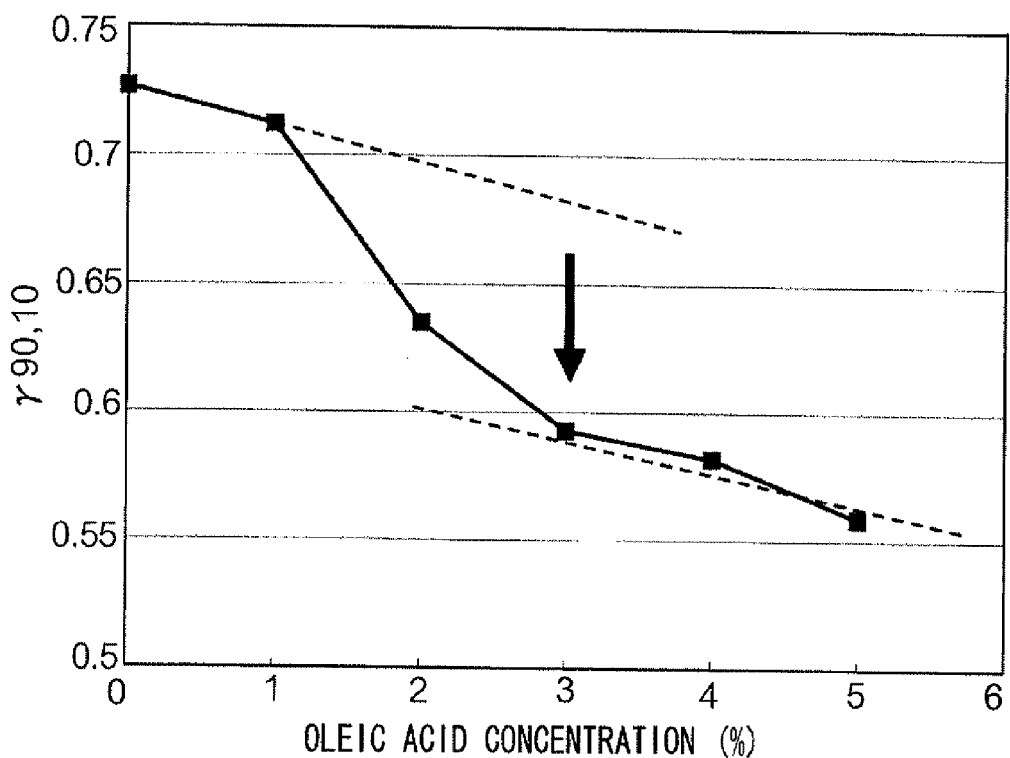
FIG. 9 is a diagram used to illustrate the effect of the amount of oleic acid added on phase change.

FIG. 9 is a diagram used to illustrate the effect of the amount of oleic acid added on the phase change from the P alignment to the F alignment. The horizontal axis indicates the amount of oleic acid added expressed in wt %, and the vertical axis indicates y90,10. As can be seen from FIG. 9, y90,10 decreases as the amount of oleic acid added increases from 0 wt % to 5 wt %, from which it is clear that the phase change from the P alignment to the F alignment becomes steeper as the added amount increases. Furthermore, a comparison made between when the amount of oleic acid added was less than approximately 3 wt % and when the amount of oleic acid added was approximately 3 wt % or more indicates that the tendency of y90,10 to decrease is different: y90,10 decreased more remarkably when the amount of oleic acid added was approximately 3 wt % or more than when the amount of oleic acid added was less than approximately 3 wt %, from which it is clear that, by setting the amount of oleic acid added to approximately 3 wt % or more, the phase change from the P alignment to the F alignment becomes steep.

Also, even when the amount of oleic acid added was less than approximately 3 wt %, y90,10 decreased. In other words, by adding an additive containing an aliphatic organic compound having at least one carbon-carbon double bond such as oleic acid to a cholesteric liquid crystal, a steep phase change from the P alignment to the F alignment can be achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A liquid crystal layer in which an additive containing an aliphatic organic compound including at least one carbon-carbon double bond is added to a cholesteric liquid crystal in an amount of approximately 3 wt % or more and approximately 10 wt % or less.

2. The liquid crystal layer according to claim 1,
    wherein the aliphatic organic compound is an alcohol, a fatty acid or an ester.

3. The liquid crystal layer according to claim 1,
    wherein carbon atoms belonging to a main chain bonded to carbon atoms forming the double bond of the aliphatic organic compound are in a cis-type configuration.

4. The liquid crystal layer according to claim 1,
    wherein the aliphatic organic compound has only one double bond.

5. The liquid crystal layer according to claim 1,
    wherein the aliphatic organic compound is oleyl alcohol, oleic acid or ethyl oleate.

6. A display medium in which two or more liquid crystal layers are laminated, in each of which liquid crystal layers an additive containing an aliphatic organic compound including at least one carbon-carbon double bond is added to a cholesteric liquid crystal in an amount of approximately 3 wt % or more and approximately 10 wt % or less,
    wherein each of the liquid crystal layers reflects light rays having different wavelengths from each other in a visible light range, and has different threshold voltages at which respective phase changes occur according to a voltage applied.

* * * * *